United States Patent
Sethi et al.

(10) Patent No.: US 12,461,788 B2
(45) Date of Patent: Nov. 4, 2025

(54) INTELLIGENT MANAGEMENT OF WORKLOADS IN HETEROGENEOUS COMPUTING ENVIRONMENT

(71) Applicant: Dell Products L.P., Round Rock, TX (US)

(72) Inventors: Parminder Singh Sethi, Ludhiana (IN); Nithish Kote, Bangalore (IN); Durai S. Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 518 days.

(21) Appl. No.: 18/078,343

(22) Filed: Dec. 9, 2022

(65) Prior Publication Data
US 2024/0192997 A1    Jun. 13, 2024

(51) Int. Cl.
G06F 9/50    (2006.01)
(52) U.S. Cl.
CPC ............ G06F 9/505 (2013.01); G06F 9/5055 (2013.01); *G06F 2209/5019* (2013.01)
(58) Field of Classification Search
None
See application file for complete search history.

(56) References Cited

U.S. PATENT DOCUMENTS

| | | | | |
|---|---|---|---|---|
| 9,557,792 B1 * | 1/2017 | Potlapally | ............ | G06F 1/3206 |
| 10,824,474 B1 * | 11/2020 | Kamboj | ................ | G06F 9/5038 |
| 2012/0284408 A1 * | 11/2012 | Dutta | .................... | G06F 9/5066 |
| | | | | 709/226 |
| 2013/0185433 A1 * | 7/2013 | Zhu | ........................ | G06F 9/5011 |
| | | | | 709/226 |
| 2015/0185794 A1 * | 7/2015 | Garden | .................... | G06F 1/206 |
| | | | | 361/679.48 |

(Continued)

OTHER PUBLICATIONS

Dell EMC, "Redfish API Reference Guide," v1.0, https://www.dell.com/support/manuals/en-us/idrac7-8-lifecycle-controller-v2.30.30.30/redfish_v2.30.30.30/overview?guid=guid-e85fd9c0-f4d1-4eff-be5d-550ebb77ff0d, Mar. 2016, 39 pages.

(Continued)

*Primary Examiner* — Adam Lee
(74) *Attorney, Agent, or Firm* — Ryan, Mason & Lewis, LLP (57) ABSTRACT

Intelligent workload management techniques in a heterogenous computing environment are disclosed. For example, a method comprises obtaining first identifying information associated with a set of workload types, and obtaining second identifying information associated with a set of server configurations associated with a computing environment, wherein one or more server configurations in the set of server configurations are different than one or more other server configurations in the set of server configurations. The method then maps individual ones of the set of workload types to individual appropriate ones of the set of server configurations based on the obtained first and second identifying information, and causes distribution of one or more workloads to one or more servers in the computing environment, in accordance with the mapping, for execution thereon. At least a portion of the obtaining and mapping steps are performed using one or more machine learning algorithms.

20 Claims, 8 Drawing Sheets

(56) References Cited

U.S. PATENT DOCUMENTS

| | | | |
|---|---|---|---|
| 2015/0205637 A1* | 7/2015 | Lee | G06N 20/10 |
| | | | 718/105 |
| 2015/0264024 A1* | 9/2015 | Frank | H04L 63/08 |
| | | | 726/3 |
| 2019/0132422 A1* | 5/2019 | Garcia Duran | G06N 3/045 |
| 2020/0099592 A1* | 3/2020 | Mahindru | G06N 20/00 |
| 2020/0118039 A1* | 4/2020 | Kocberber | G06F 1/266 |
| 2020/0162329 A1* | 5/2020 | Mermoud | H04L 43/04 |
| 2020/0174840 A1* | 6/2020 | Zhao | G06F 9/5011 |
| 2021/0342199 A1* | 11/2021 | Bhatnagar | H04L 41/0896 |
| 2022/0129536 A1* | 4/2022 | O'Brien, III | G06F 21/572 |
| 2022/0197773 A1* | 6/2022 | Butler | G06F 9/505 |
| 2022/0272043 A1* | 8/2022 | Mishra | G06N 20/00 |
| 2024/0086246 A1* | 3/2024 | Doiron | G06F 9/5072 |
| 2024/0103899 A1* | 3/2024 | Chen | G06F 9/45558 |

OTHER PUBLICATIONS

Dell Inc., "PowerEdge Servers and Solutions for Business Applications," May 2012, 10 pages.

A. Armstrong, "Dell EMC Unveils PowerEdge Servers For AI & ML," https://www.storagereview.com/news/dell-emc-unveils-poweredge-servers-for-ai-ml, May 1, 2018, 4 pages.

* cited by examiner

| WORKLOAD | SERVER TYPES | SERVER MODEL |
|---|---|---|
| COLLABORATION APPLICATION | RACKS | R750 |
| | MODULAR | M630 |
| | TOWER | T450 / T640 |
| EMAIL APPLICATION | RACKS | R515-12 hard drive / R730xd |
| | MODULAR | M630 |
| | TOWER | T450 / T640 |
| COMMUNICATION APPLICATION | RACKS | R730/R730xd/R740 |
| | MODULAR | Mx740, Mx840c |
| | TOWER | T640 |
| HIGH PERFORMANCE COMPUTING APPLICATION | RACKS | HEAD- R840 EDGE COMPUTE – R630/C6145/ C6220 |
| | MODULAR | M630 |
| VIRTUALIZATION APPLICATION | RACKS | R830 / R730 / R630 |
| | MODULAR | M630 |
| | TOWER | T630 |
| ARTIFICIAL INTELLIGENCE/ MACHINE LEARNING APPLICATION | RACKS | R740XD/R930/R940 |
| | MODULAR | MX740C/840C |

| TRAINING SPEED | PROCESSOR 1 | PROCESSOR 2 |
|---|---|---|
| | 0.233 SEC/BATCH | 0.170 SEC/BATCH |

| PROCESSOR BRAND | PROCESSOR VERSION | CURRENT SPEED | STATE | CORE COUNT | MEMORY DETAILS |
|---|---|---|---|---|---|
| PROCESSOR 1 @ 2.00GHz | MODEL 106 STEPPING 6 | 2000 MT/S | PRESENCE DETECTED | 14 | 64GB - DDR4 |

| PROCESSOR NAME | PROCESSOR 1 | PROCESSOR 2 |
|---|---|---|
| NUMBER OF SOCKETS | 2 | 2 |
| NUMBER OF CORES | 14 | 18 |
| SPEED/FREQUENCY | 2600MHz | 2600MHz |
| CACHE SIZE | 19.25 MB | 24.75 MB |
| TRAINING DURATION | ~360 MINS | ~275 MINS |
| EVALUATION PRECISION | PRECISION @ 1 = 0.863 | PRECISION @ 1 = 0.863 |
| TRAINING SPEED | 0.233 SEC/BATCH | 0.170 SEC/BATCH |

INTELLIGENT MANAGEMENT OF WORKLOADS IN HETEROGENEOUS COMPUTING ENVIRONMENT

FIELD

The field relates generally to information processing systems, and more particularly to workload management in information processing systems with heterogenous computing environments.

BACKGROUND

Modern data centers typically comprise thousands of interconnected servers that have the capability of hosting a large number of application programs (applications). Such data centers can be implemented in cloud-based platforms. Such cloud-based data centers typically have a mix of heterogeneous types of servers. The cloud-based data center receives many traditional and modern workloads that require processing. Not every server in the data center is able to process modern workloads. As a result, the performance and efficiency of the data center is impacted.

SUMMARY

Embodiments provide workload management techniques in an information processing system with a heterogenous computing environment.

For example, in one embodiment, a method comprises obtaining first identifying information associated with a set of workload types, and obtaining second identifying information associated with a set of server configurations associated with a computing environment, wherein one or more server configurations in the set of server configurations are different than one or more other server configurations in the set of server configurations. The method then maps individual ones of the set of workload types to individual appropriate ones of the set of server configurations based on the obtained first and second identifying information, and causes distribution of one or more workloads to one or more servers in the computing environment, in accordance with the mapping, for execution thereon. At least a portion of the obtaining and mapping steps are performed using one or more machine learning algorithms.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide an intelligent approach to manage and distribute different types of workloads to the best-suited servers that can process them efficiently with minimal latency and improved resource utilization of the underlying information processing system.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As illustratively used herein, "real-time" refers to anything (e.g., an output, a process, data, a workload, etc.) within strict or otherwise tightly-defined time constraints.

Further, real-time can be understood to be instantaneous or on the order of milliseconds or microseconds or otherwise contemporaneous, current, or without any significant time delay. Of course, it should be understood that depending on the particular temporal nature of the system in which an embodiment is implemented, other appropriate timescales or temporal conditions can be achieved or otherwise implemented.

As mentioned above, modern cloud-based data centers comprise thousands of interconnected servers with the capability of hosting a large number of applications. However, it is also realized that the reliability of a cloud-based computing platform can be a concern among users due to the lifespan and performance of each server and certain ones of its components. In particular, most of the components in a server are non-mechanical and can last indefinitely with the notable exception of hard drives.

It is also realized that the lifetime of the server should take into consideration how long a server remains cost-efficient to maintain. Beyond a certain point, continuing to manage servers that struggle to keep up with modern workloads is less effective than replacing them with new servers. It can be easier to manage a single server that can handle a large modern workload, rather than managing multiple legacy servers to support the same workload. As a result, a significantly large number of failures manifest in the system. These failures can cause significant adverse implications to the hosted applications, impacting their availability and performance. For example, Amazon's Elastic Compute Cloud (EC2) experienced failure in the Elastic Block Storage (EBS) drives and network configuration, bringing down thousands of hosted applications and websites for 24 to 72 hours.

There are many other examples that indicate the widespread damage that faulty cloud computing mechanisms can cause. While some damage may be temporary, such as email downtime, others are long-lasting and cause a significant impact. Therefore, it is important that information technology (IT) experts decode how to fortify a cloud-based computing platform to make it as infallible as possible. Only then can one expect enterprises to fully trust a cloud computing paradigm.

As also mentioned above, in modern cloud-based data centers, there exist many heterogeneous servers that may be called on to serve traditional and modern workloads. However, not every server in a cloud-based data center that receives a modern workload, such as a data science workload or an artificial intelligence/machine learning (AI/ML) workload, can process the workload effectively leading to performance degradation in the cloud environment.

Illustrative embodiments overcome the above and other technical drawbacks by providing techniques for intelligent workload management in a heterogenous computing environment.

Figure 1:
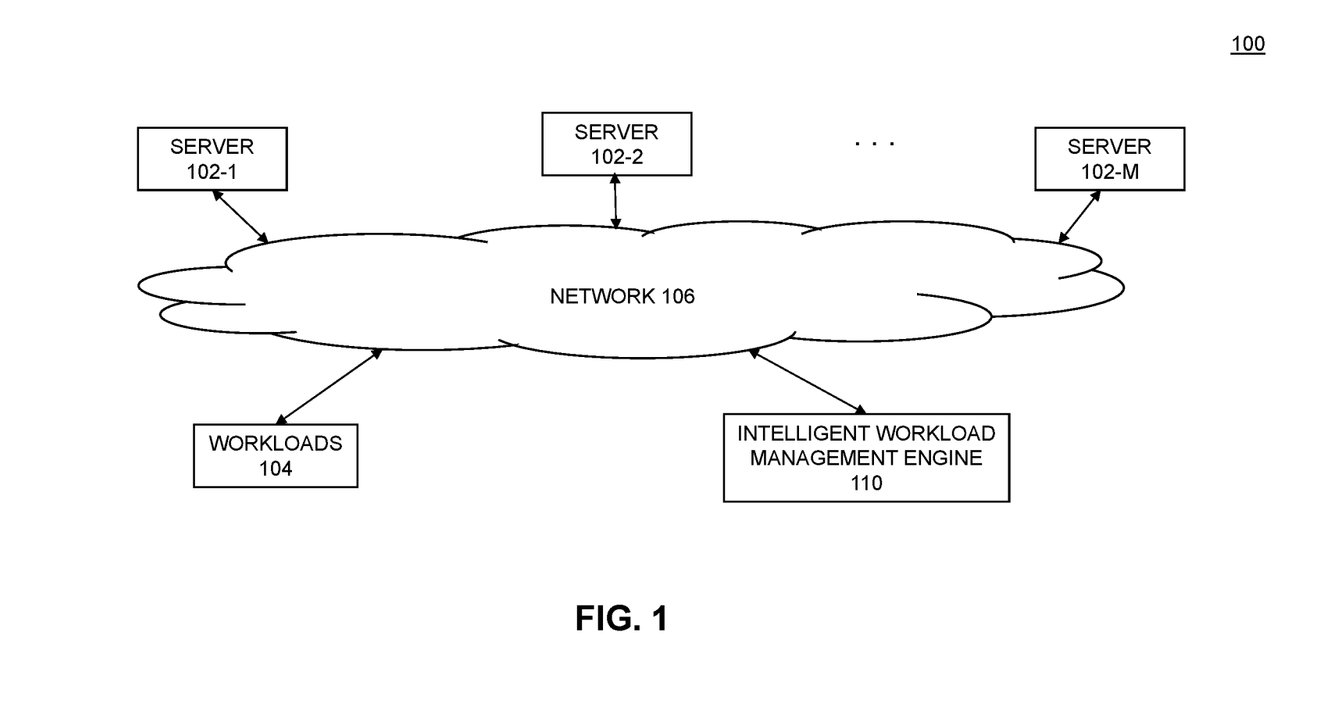
FIG. 1 depicts an information processing system with an intelligent workload management engine according to an illustrative embodiment.

FIG. 1 shows an information processing system 100 configured in accordance with an illustrative embodiment. The information processing system 100 comprises servers 102-1, 102-2, . . . 102-M (collectively referred to herein as servers 102 or individually as server 102). The servers 102 are configured to process one or more of workloads 104. Examples of workloads 104 can include processing tasks associated with applications, some of which may be traditional (e.g., email applications, database applications) and some of which are modern (e.g., AI/ML application). It is assumed that servers 102 are heterogenous in that one or more of servers 102 are of a different type than one or more other ones of servers 102 as will be further illustrated herein.

The servers 102 communicate over a network 106 with an intelligent workload management engine 110 which, as will be explained in detail herein, utilizes one or more machine learning algorithms, to consider workload types and server types and map workloads to appropriate servers for distribution thereto and execution thereon. The variable M and other similar index variables herein such as K and L are assumed to be arbitrary positive integers greater than or equal to one.

The servers 102 can comprise, for example, desktop, laptop or tablet computers, host devices, storage devices, mobile telephones, Internet of Things (IoT) devices or other types of processing devices capable of communicating with intelligent workload management engine 110 over the network 106. Such devices are examples of what are more generally referred to herein as processing devices. Some of these processing devices are also generally referred to herein as computers. Servers 102 may also or alternately comprise virtualized computing resources, such as virtual machines (VMs), containers, etc. Servers 102 in some embodiments comprise respective computers associated with a particular company, organization or other enterprise. In illustrative embodiments, while servers 102 are discussed in terms of processing devices associated with a cloud-based data center, the embodiments are not necessarily limited thereto, and may be applied to different devices and computing environments or paradigms.

The terms "user," "customer," "client" or "administrator" herein are intended to be broadly construed so as to encompass numerous arrangements of human, hardware, software or firmware entities, as well as combinations of such entities.

Although not explicitly shown in FIG. 1, one or more input-output devices such as keyboards, displays or other types of input-output devices may be used to support one or more user interfaces for servers 102 and intelligent workload management engine 110, as well as to support communication therebetween, and/or other related systems and devices not explicitly shown.

Figure 2:
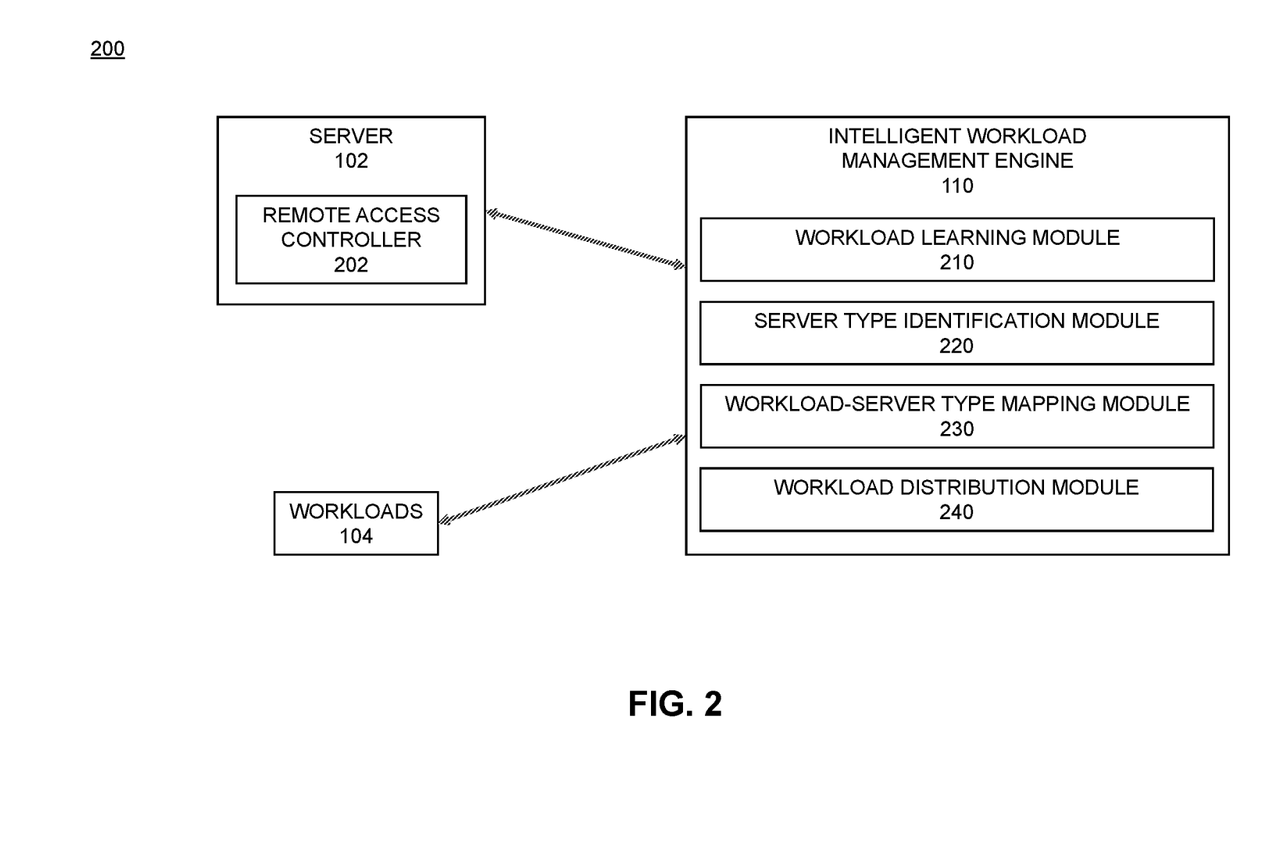
FIG. 2 depicts a computing environment with an intelligent workload management engine according to an illustrative embodiment.

FIG. 2 depicts a computing environment 200 associated with intelligent workload management engine 110 according to an illustrative embodiment. More particularly, as will be further explained, intelligent workload management engine 110 is configured to obtain or otherwise determine the following:

(i) Server model and configuration information for each server 102. In illustrative embodiments, each server 102 comprises a remote access controller 202 which is configured to provide the server model and configuration information to intelligent workload management engine 110. In one non-limiting example, assuming server 102 is one of the commercially-available versions of the PowerEdge server family from Dell Technologies, remote access controller 202 can be implemented as an Integrated Dell Remote Access Controller (iDRAC). The iDRAC is designed for secure local and remote server management and helps IT administrators deploy, update and monitor a PowerEdge server anywhere at any time.

(ii) Workload type information. In one non-limiting example, a cloud-specific workload that is part of workloads 104 is tagged by a cloud user or administrator. With this information, intelligent workload management engine 110 can determine the workload type.

Figure 3A:
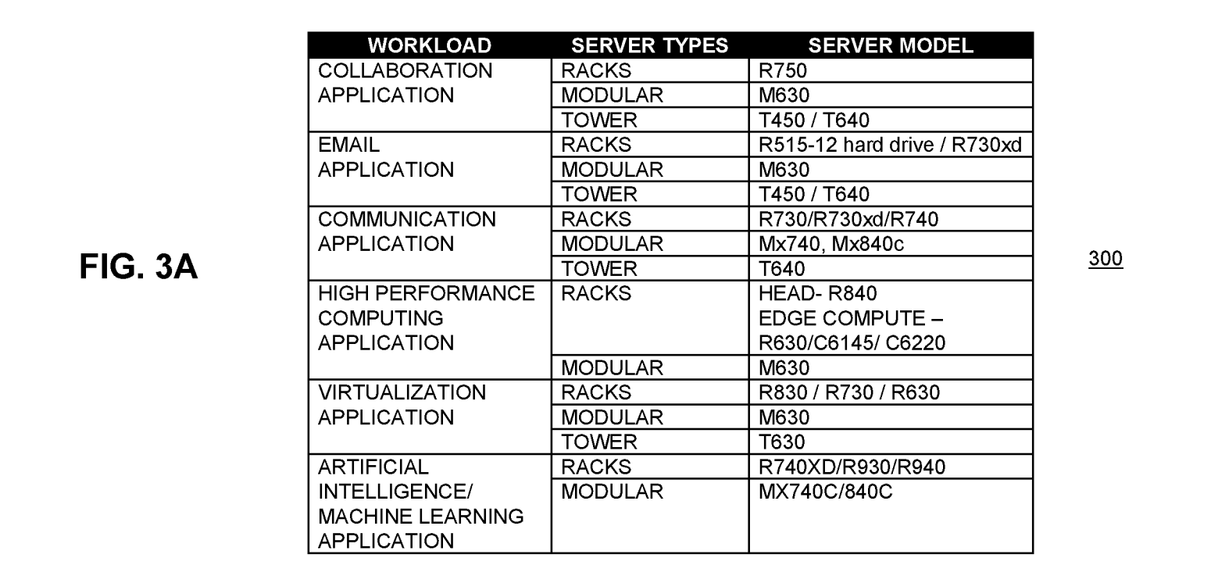
FIGS. 3A and 3B depict examples of types of workloads and types of server configurations with which an intelligent workload management engine according to an illustrative embodiment may be implemented.
Figure 3B:
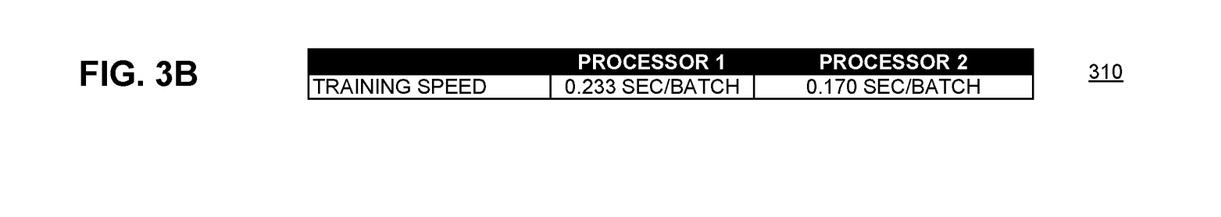

In one illustrative embodiment, intelligent workload management engine 110 obtains and stores the information for workloads 104 and the different server models and server configurations for each server 102 and maps the best-suited server 102 for a specific one of workloads 104. By way of example only, FIG. 3A depicts a mapping table 300 specifying the best-suited server model of a given server type (e.g., rack, modular, tower) based on a workload type. Examples of workload types include, but are not limited to, workloads associated with a collaboration application (e.g., SharePoint), an email application (e.g., Exchange), a communication application (e.g., Lync Server), a high performance computing (HPC) application, a virtualization application, and an AI/ML application. Intelligent workload management engine 110 may also obtain detailed information such as the processing time taken for a specific workload of the same generation server with different processor models. By way of example only, FIG. 3B depicts a table 310 specifying training speeds associated with two different processor models, Processor 1 and Processor 2 (e.g., Intel Xeon Gold 6132 and Intel Xeon Gold 6240). Accordingly, intelligent workload management engine 110 considers the training speed of the processor, and/or other resources as described herein, to determine which server has to be (or should be) assigned to process a specific kind of workload.

In one or more illustrative embodiments, intelligent workload management engine 110 utilizes one or more machine learning algorithms to learn about the real-time workloads in a cloud-based data center and the real-time information about the server model and the type of processing that the server has processed over a given period of time. For example, intelligent workload management engine 110 uses supervised methods of a machine learning model to identify what kinds of workloads are being processed day-to-day by each server in the cloud-based data center.

In some illustrative embodiments, intelligent workload management engine 110 uses telemetry information, server information, and workload datasheet information announced by vendors, as well as real-time information about previous workloads that have performed best on a family or model of server in the data center. Accordingly, intelligent workload management engine 110 then can distribute subsequent workloads to the best-suited servers in real-time so the workload placement happens effectively. Further, when new servers are brought online in the cloud-based data center, intelligent workload management engine 110 is configured to learn about those servers such that they can be considered in the workload mapping and distribution process.

Intelligent workload management engine 110 utilizes one or more machine learning algorithms to consider workload types and server types (e.g., model and configuration) and map workloads 104 to the appropriate servers 102 for distribution thereto and execution thereon. As shown in FIG. 2, intelligent workload management engine 110 is configured to perform the above and other functionalities via one or more modules comprising a workload learning module 210, a server type identification module 220, a workload-server type mapping module 230, and a workload distribution module 240.

Figure 4:
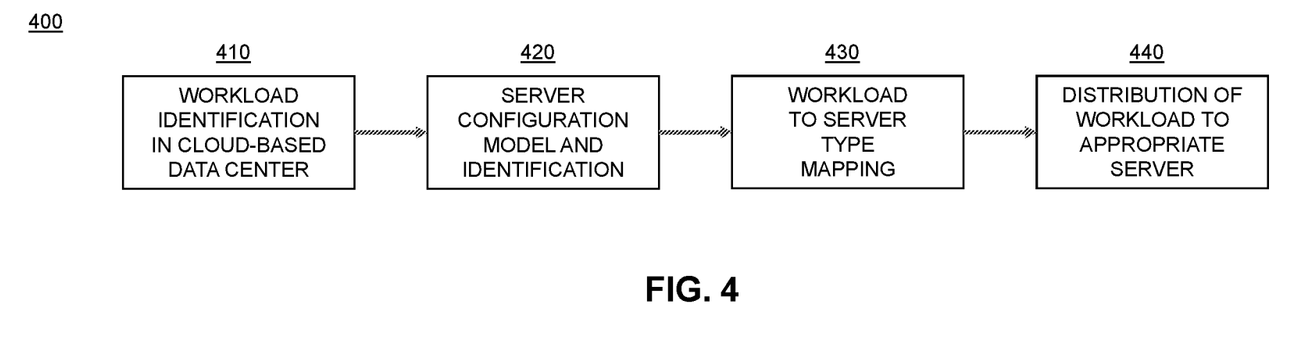
FIG. 4 depicts an intelligent workload management process flow according to an illustrative embodiment.

Referring now to FIG. 4, a process 400 comprises the steps (stages) that correspond to the operations of each of workload learning module 210, server type identification module 220, workload-server type mapping module 230, and workload distribution module 240. More particularly: step 410 is performed by workload learning module 210 to identify workload information in a cloud-based data center; step 420 is performed by server type identification module 220 to identify server configuration model information in the cloud-based data center; step 430 is performed by workload-server type mapping module 230 to map workloads to appropriate servers in the cloud-based data center; and step 440 is performed by workload distribution module 240 to cause distribution of the workloads to the appropriate servers.

Figure 5:
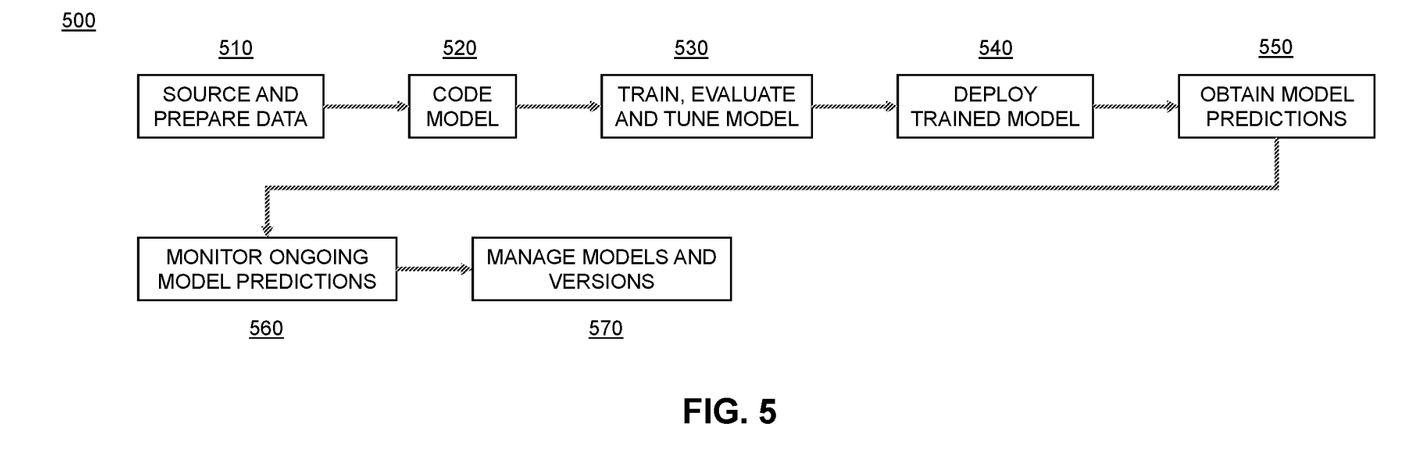
FIG. 5 depicts a supervised machine learning process flow with which an intelligent workload management engine according to an illustrative embodiment may be implemented.

More particularly, in illustrative embodiments, step 410 uses a supervised method of learning about the type of workloads such as, but not limited to, a database workload, a virtualization workload, an AI/ML workload, an HPC workload, a GPU/FPGA workload, and an email workload. FIG. 5 depicts a supervised machine learning model process 500 that can be used to learn about the real-time best processing for a specific server. In supervised machine learning model process 500, source files (e.g., workload information, server type/configuration information, etc.) are collected and data is prepared based on the collected input in step 510. Next, in step 520, supervised machine learning model process 500 decides what type of code will fit the learning model and which learning model suits the workload and server environment. In step 530, the learning model is trained, evaluated, and tuned based on the evaluation. The trained learning model is deployed, in step 540, and predictions from the learning model are obtained in step 550. The learning model is monitored in terms of ongoing predictions in step 560, and the learning model and versions thereof can be managed (e.g., replaced, updated, retrained, etc.) in step 570, based on the monitoring.

Figure 6A:
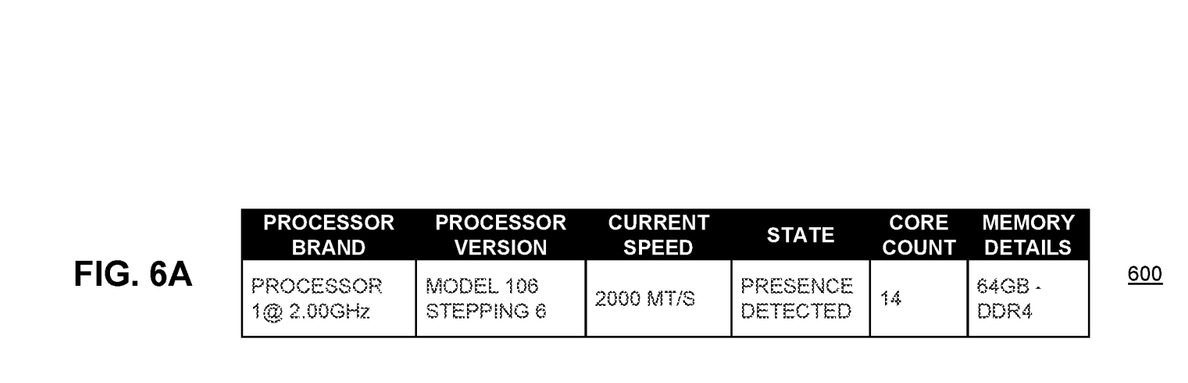
FIGS. 6A and 6B depict further examples of types of server configurations with which an intelligent workload management engine according to an illustrative embodiment may be implemented.

In step 420, according to illustrative embodiments, server configuration information is obtained and supplied to the learning model of step 410. As mentioned herein, such server configuration information can be from a remote access controller (e.g., 202 in FIG. 2) of each server. Table 600 in FIG. 6A illustrates an example of such information that can be obtained through an application programming interface (API) of the remote access controller in each server.

In step 430, according to illustrative embodiments, workloads are mapped to appropriate servers in the cloud-based data center. In some illustrative embodiments, different tools can be utilized to generate such mapping including, but not limited to, published workloads for server sites, real-time running of test workloads such as a training set on the servers and learning based on the response for a specific workload, server configurations specific for specific workloads, etc. Based on one or more of these tools, step 430 decides which server would be the best fit (e.g., appropriate, optimal, best-suited, etc.) to run a specific workload in the cloud-based data center.

Figure 6B:
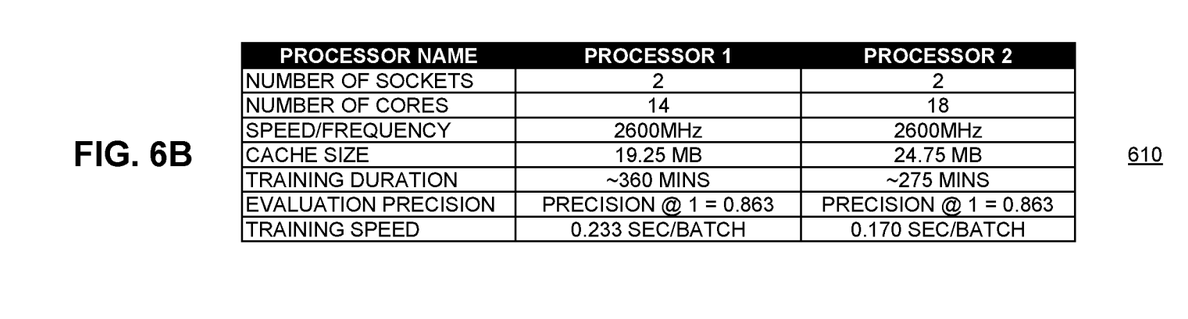

In one non-limiting example, assume that a TensorFlow cifar10 training module is run on two different processor-based servers of the same server models with the same configurations. Table 610 in FIG. 6B depicts such an example. Note that the training speed of processing is different for the same generation of servers for a supervised AI/ML workload. As illustrated, a specific workload was run on a server with Processor 1 as configured (e.g., 2 sockets with 14 cores) and provided a training speed @0.233 sec/batch. In comparison, a server with Processor 2 as configured (e.g., 2 sockets with 18 cores) gives an output of 0.170 sec/batch. Even though the two servers are of the same generation and have different configuration sets, Processor 2 would be the best selection to process this training workload effectively. Also, it is assumed that Processor 2 supports Intel AVX 512 operation with a vector neural network instruction (VNNI) set for short math operations which is the best output for a certain kind of data science workload for short vector multiplication operation which is internal to the workload type. It is assumed that Processor 1 does not support the short math VVNI sets to be processed effectively. It is to be appreciated that the speed of processing may even be lower, i.e., training speed/batch will take even longer for processing for a previous generation server that is part of the cloud-based data center. As such, step 430 takes these and one or more other factors described herein into account in generating the appropriate mapping of workload to server. In some illustrative embodiments, step 430 can utilize a supervised machine learning model (e.g., supervised machine learning model process 500) to generate the mapping.

In step 440, according to illustrative embodiments, workloads are distributed to the appropriate servers in accordance with the mapping of step 430. That is, for a specific workload, the server that is identified in step 430 receives and executes the workload.

In illustrative embodiments, the execution output serves to update in real-time workload profiles used by intelligent workload management engine 110. Note that some examples of workload profiles include, but are not limited to, an HPC profile, a virtualization optimization profile, a database performance profile, and a Telco profile. The following is an example output file (profile):

```
<SystemConfiguration Model="PowerEdge R650"
ServiceTag="abcde"
TimeStamp="Mon Aug 8 15:41:19 2022">
    <!--Export type is Normal,XML,Selective-->
    <Component FQDD="BIOS">
        <Attribute Name="WorkloadProfile">HPC>
        <Attribute Name="LogicalProc">Disabled>
```

Figure 7:
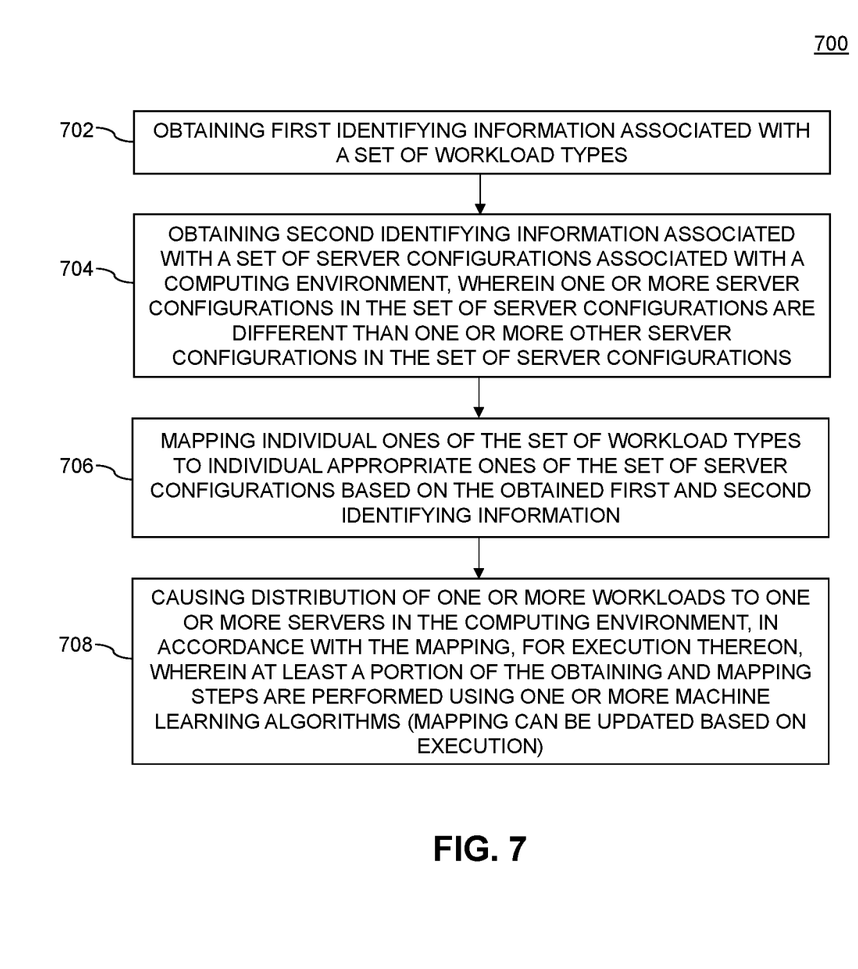
FIG. 7 depicts an intelligent workload management methodology according to an illustrative embodiment.

The operation of the information processing system 100 will now be described in further detail with reference to the flow diagram of FIG. 7. With reference to FIG. 7, a methodology 700 for intelligent workload management as shown includes steps 702 through 708, and is suitable for use in the system 100 but is more generally applicable to other types of information processing systems comprising a workload management.

Step 702 obtains first identifying information associated with a set of workload types.

Step 704 obtains second identifying information associated with a set of server configurations associated with a computing environment, wherein one or more server configurations in the set of server configurations are different than one or more other server configurations in the set of server configurations.

Step 706 maps individual ones of the set of workload types to individual appropriate ones of the set of server configurations based on the obtained first and second identifying information. It is to be appreciated that the terms "appropriate ones of the set of server configurations' generally refers to server configurations that are, for example, best-suited, optimal, preferred, required, and/or the like, for a given workload type.

Step 708 causes distribution of one or more workloads to one or more servers in the computing environment, in accordance with the mapping, for execution thereon.

In methodology 700, at least a portion of the obtaining and mapping steps (e.g., steps 702, 704, and 706) are performed using one or more machine learning algorithms.

In some embodiments, the one or more machine learning algorithms comprise a supervised machine learning model process configured to provide one or more predictions based on at least a portion of the first and second identifying information.

In some embodiments, obtaining first identifying information associated with a set of workload types further comprises obtaining information indicative of a type of application program with which the workload type is associated.

In some embodiments obtaining second identifying information associated with a set of server configurations further comprises obtaining at least one of server type information and server model information for each one of the set of server configurations.

In some embodiments, one of the server type information and the server model information comprises information indicative of one or more attributes of a processor associated with each one of the set of server configurations.

In some embodiments, the one or more attributes of the processor associated with each one of the set of server configurations comprises one or more of: a processor brand; a processor version; a processor speed; a processor state; a processor core count; and a processor memory configuration.

In some embodiments, methodology 700 further comprises updating the mapping of the individual ones of the set of workload types to the individual appropriate ones of the set of server configurations based on execution of the one or more workloads on the one or more servers in the computing environment.

Advantageously, intelligent workload management engine 110 provides a highly effective matching module for the most appropriate processor type (e.g., central processing unit or CPU) mapping as per the workload request by leveraging collected telemetry information such as memory configuration, training speed, processor count, etc. Accordingly, the intelligent workload management methodology can predict a failure rate of mapping less appropriate and recommended CPUs by testing and discarding the recommendation to prevent delay in performance in each training cycle.

It is to be appreciated that the FIG. 7 process and other features and functionality described above can be adapted for use with other types of information systems configured to execute workload management services in a workload management computing platform or other type of computing platform.

The particular processing operations and other system functionality described in conjunction with the flow diagram of FIG. 7 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a processor-readable storage medium.

Illustrative embodiments of systems with an intelligent workload management engine as disclosed herein can provide a number of significant advantages relative to conventional arrangements. For example, the intelligent workload management engine effectively uses machine learning techniques to predict the best-suited servers for serving specific workloads in a data center. As a result, the embodiments enable more efficient use of compute resources, improve performance and reduce or eliminate downtime by distributing workloads to appropriate servers for execution based on real-time and/or historical information.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a processing device in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the intelligent workload management engine 110 or portions thereof are illustratively implemented for use by tenants of such a multi-tenant environment.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
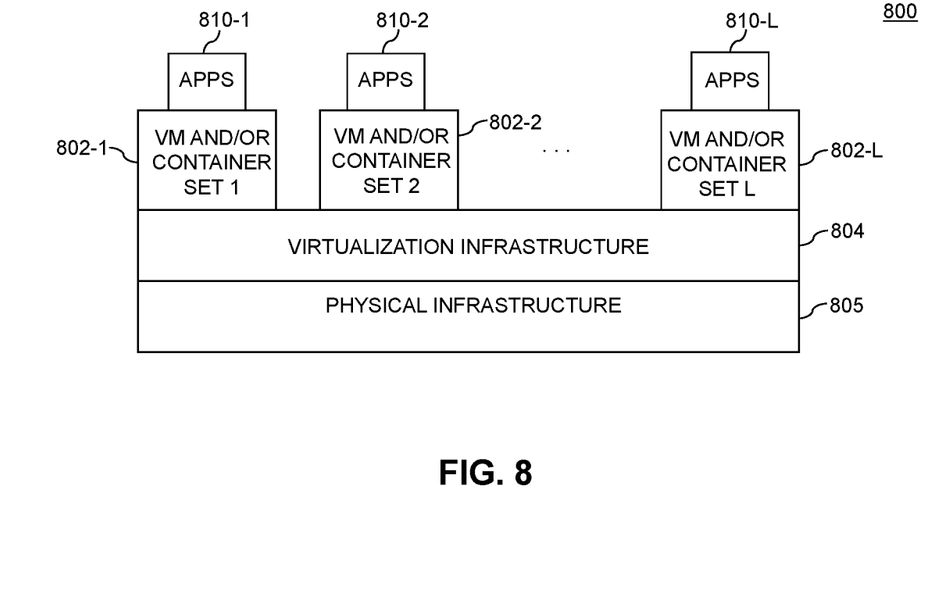
FIGS. 8 and 9 show examples of processing platforms that may be utilized to implement at least a portion of an information processing system according to illustrative embodiments.
Figure 9:
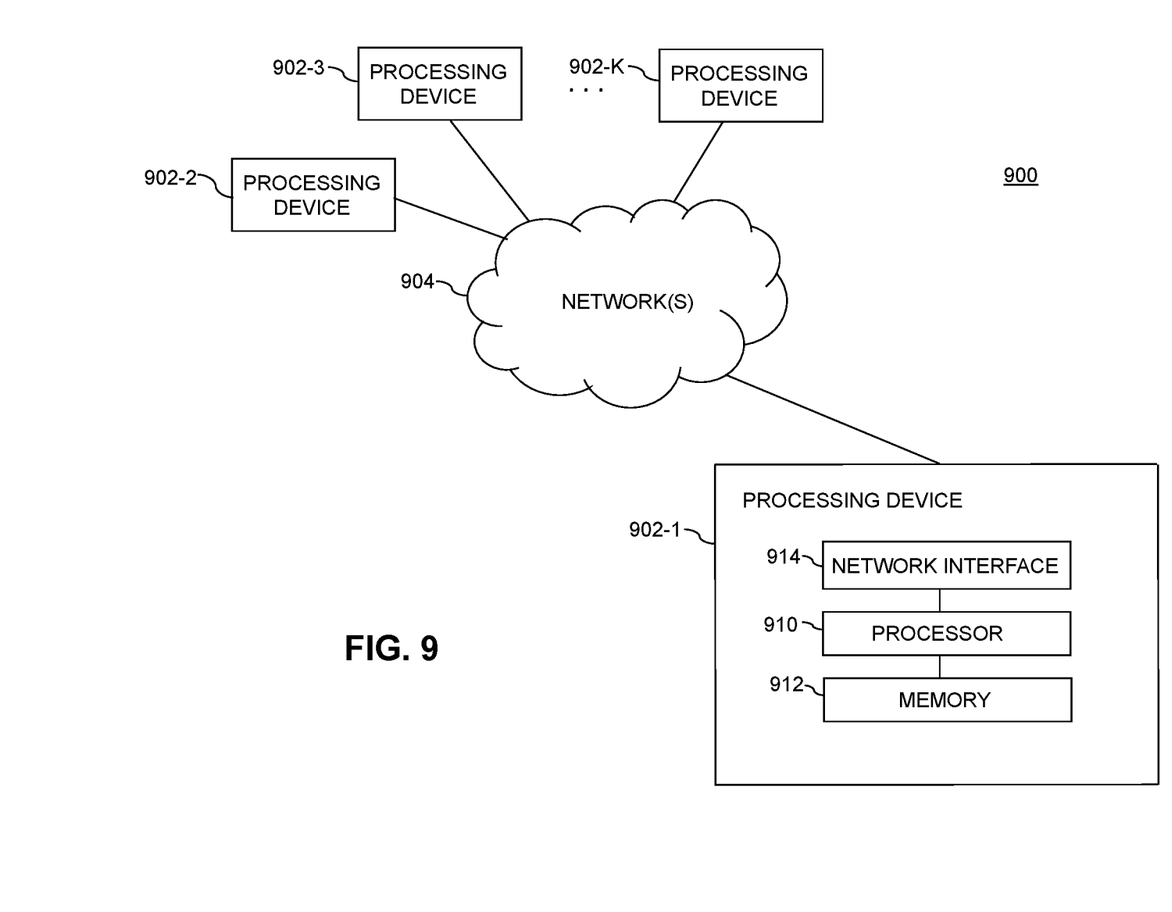

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912. The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as processor-readable storage media storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the intelligent workload management engine 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and workload management environments. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method executed by a processing device operatively coupled to a memory comprising:
testing a first mapping by executing one or more test workloads on one or more servers of a plurality of servers in a computing environment based on the first mapping, wherein:
the first mapping maps individual ones of a set of workload types to individual appropriate ones of a set of server configurations based on first identifying information and second identifying information;
the first identifying information and the second identifying information are based on one or more machine learning algorithms;
the first identifying information is associated with the set of workload types;
the second identifying information is associated with the set of server configurations associated with the computing environment; and
one or more server configurations in the set of server configurations are different than one or more other server configurations in the set of server configurations;
discarding the first mapping when a result of the executing indicates that the first mapping is less effective than a second mapping, wherein the testing and the discarding produce a predicted failure rate associated with the first mapping, and wherein the second mapping is selected based on the predicted failure rate;
causing distribution of one or more workloads to one or more servers of the plurality of servers in the computing environment, in accordance with the second mapping, for execution thereon, wherein the first mapping and the second mapping are generated using the one or more machine learning algorithms; and
executing the one or more workloads on the one or more servers of the plurality of servers in accordance with the second mapping.

2. The method of claim 1, wherein the one or more machine learning algorithms comprise a supervised machine learning model process configured to provide one or more predictions associated with the one or more servers of the plurality of servers based on at least a portion of the first and second identifying information.

3. The method of claim 1, wherein the first identifying information associated with the set of workload types is associated with information indicative of a type of application program with which a workload type of the set of workload types is associated.

4. The method of claim 1, wherein the second identifying information associated with the set of server configurations is associated with at least one of server type information and server model information for each one of the set of server configurations.

5. The method of claim 4, wherein one of the server type information and the server model information comprises information indicative of one or more attributes of a processor associated with each one of the set of server configurations.

6. The method of claim 5, wherein the one or more attributes of the processor associated with each one of the set of server configurations comprises one or more of: a processor brand; a processor version; a processor speed; a processor state; a processor core count; and a processor memory configuration.

7. The method of claim 1, further comprising updating the second mapping of the individual ones of the set of workload types to the individual appropriate ones of the set of server configurations based on the execution of the one or more workloads on the one or more servers of the plurality of servers in the computing environment.

8. The method of claim 1, wherein the computing environment comprises a cloud-based data center.

9. An apparatus comprising:
a processing device operatively coupled to a memory and configured to execute steps of:

testing a first mapping by executing one or more test workloads on one or more servers of a plurality of servers in a computing environment based on the first mapping, wherein:
the first mapping maps individual ones of a set of workload types to individual appropriate ones of a set of server configurations based on first identifying information and second identifying information;
the first identifying information and the second identifying information are based on one or more machine learning algorithms;
the first identifying information is associated with the set of workload types;
the second identifying information is associated with the set of server configurations associated with the computing environment; and
one or more server configurations in the set of server configurations are different than one or more other server configurations in the set of server configurations;
discarding the first mapping when a result of the executing indicates that the first mapping is less effective than a second mapping, wherein the testing and the discarding produce a predicted failure rate associated with the first mapping, and wherein the second mapping is selected based on the predicted failure rate;
causing distribution of one or more workloads to one or more servers of the plurality of servers in the computing environment, in accordance with the second mapping, for execution thereon, wherein the first mapping and the second mapping are generated using the one or more machine learning algorithms; and
executing the one or more workloads on the one or more servers of the plurality of servers in accordance with the second mapping.

10. The apparatus of claim 9, wherein the one or more machine learning algorithms comprise a supervised machine learning model process configured to provide one or more predictions associated with the one or more servers of the plurality of servers based on at least a portion of the first and second identifying information.

11. The apparatus of claim 9, wherein the first identifying information associated with the set of workload types is associated with information indicative of a type of application program with which a workload type of the set of workload types is associated.

12. The apparatus of claim 9, wherein the second identifying information associated with the set of server configurations is associated with at least one of server type information and server model information for each one of the set of server configurations.

13. The apparatus of claim 12, wherein one of the server type information and the server model information comprises information indicative of one or more attributes of a processor associated with each one of the set of server configurations.

14. The apparatus of claim 13, wherein the one or more attributes of the processor associated with each one of the set of server configurations comprises one or more of: a processor brand; a processor version; a processor speed; a processor state; a processor core count; and a processor memory configuration.

15. The apparatus of claim 9, wherein the processing device operatively coupled to the memory is further configured to update the second mapping of the individual ones of the set of workload types to the individual appropriate ones of the set of server configurations based on the execution of the one or more workloads on the one or more servers of the plurality of servers in the computing environment.

16. The apparatus of claim 9, wherein the computing environment comprises a cloud-based data center.

17. An article of manufacture comprising a non-transitory processor-readable storage medium having stored therein program code of one or more software programs, wherein the program code when executed by at least one processing device causes said at least one processing device to execute steps of:
testing a first mapping by executing one or more test workloads on one or more servers of a plurality of servers in a computing environment based on the first mapping, wherein:
the first mapping maps individual ones of a set of workload types to individual appropriate ones of a set of server configurations based on first identifying information and second identifying information;
the first identifying information and the second identifying information are based on one or more machine learning algorithms;
the first identifying information is associated with the set of workload types;
the second identifying information is associated with the set of server configurations associated with the computing environment; and
one or more server configurations in the set of server configurations are different than one or more other server configurations in the set of server configurations;
discarding the first mapping when a result of the executing indicates that the first mapping is less effective than a second mapping, wherein the testing and the discarding produce a predicted failure rate associated with the first mapping, and wherein the second mapping is selected based on the predicted failure rate;
causing distribution of one or more workloads to one or more servers of the plurality of servers in the computing environment, in accordance with the second mapping, for execution thereon, wherein the first mapping and the second mapping are generated using the one or more machine learning algorithms; and
executing the one or more workloads on the one or more servers of the plurality of servers in accordance with the second mapping.

18. The article of claim 17, wherein the one or more machine learning algorithms comprise a supervised machine learning model process configured to provide one or more predictions associated with the one or more servers of the plurality of servers based on at least a portion of the first and second identifying information.

19. The article of claim 17, wherein the first identifying information associated with the set of workload types is associated with information indicative of a type of application program with which a workload type of the set of workload types is associated.

20. The article of claim 17, wherein the second identifying information associated with the set of server configurations is associated with at least one of server type information and server model information for each one of the set of server configurations.

* * * * *